(12) United States Patent
Williams

(10) Patent No.: US 8,697,971 B1
(45) Date of Patent: Apr. 15, 2014

(54) MUSICAL INSTRUMENT TRAINING AID

(76) Inventor: Michael B. Williams, Gilmer, TX (US)

( * ) Notice: Subject to any disclaimer, the term of this patent is extended or adjusted under 35 U.S.C. 154(b) by 29 days.

(21) Appl. No.: 13/601,564

(22) Filed: Aug. 31, 2012

Related U.S. Application Data

(60) Provisional application No. 61/530,690, filed on Sep. 2, 2011.

(51) Int. Cl.
  *G09B 15/06* (2006.01)
(52) U.S. Cl.
  USPC .............................. 84/465; 84/453; 84/387 R
(58) Field of Classification Search
  None
  See application file for complete search history.

(56) References Cited

U.S. PATENT DOCUMENTS

| | | | | |
|---|---|---|---|---|
| 776,785 | A * | 12/1904 | Kruse | 84/399 |
| 1,385,812 | A * | 7/1921 | Binns | 84/465 |
| 1,386,823 | A * | 8/1921 | Wetmore | 84/465 |
| 1,421,529 | A * | 7/1922 | Millhouse | 15/160 |
| 1,763,336 | A * | 6/1930 | Wilder | 84/387 R |
| 2,164,458 | A * | 7/1939 | Jacobson | 84/465 |
| 2,515,411 | A * | 7/1950 | La Velle | 84/398 |
| 3,164,052 | A * | 1/1965 | De Mire | 84/398 |
| 3,293,976 | A * | 12/1966 | Windows, Jr. | 84/453 |
| 3,327,580 | A * | 6/1967 | Herweg | 84/453 |
| 3,659,489 | A * | 5/1972 | Vale | 84/465 |
| 3,721,151 | A * | 3/1973 | Dimond | 84/398 |
| 3,739,420 | A * | 6/1973 | Kafkis | 15/211 |
| 3,853,034 | A * | 12/1974 | Vale | 84/465 |
| 4,120,228 | A * | 10/1978 | Windows, Jr. | 84/453 |
| 4,245,544 | A * | 1/1981 | Holland | 84/465 |
| 4,378,724 | A * | 4/1983 | Lamart | 84/465 |
| 4,658,697 | A * | 4/1987 | Wean | 84/465 |
| 4,742,755 | A * | 5/1988 | Peterson | 84/453 |
| 5,212,332 | A * | 5/1993 | Gigliotti | 84/453 |
| 5,555,588 | A * | 9/1996 | Viesehon | 15/104.16 |
| 6,316,707 | B1 * | 11/2001 | Glover, II | 84/387 A |
| 6,768,045 | B1 * | 7/2004 | Ellis | 84/465 |
| 7,615,700 | B2 * | 11/2009 | DiClaudio | 84/398 |
| 7,812,238 | B2 * | 10/2010 | Jancic | 84/465 |
| 2012/0085220 | A1 * | 4/2012 | Takahashi | 84/465 |

OTHER PUBLICATIONS

Ericson, John, Hornmasters on Mouthpiece Placement, Hornmatters, Aug. 17, 2010.*
Trumpet High notes Brio, Uploaded Mar. 18, 2011, viewed at http://www.youtube.com/watch?v=PFv-tUAZwdc onNov. 25, 2013.*

* cited by examiner

*Primary Examiner* — Robert W Horn
(74) *Attorney, Agent, or Firm* — Bell Nunnally & Martin LLP; Craig J. Cox

(57) ABSTRACT

A teaching aid for players of brass instruments is described that includes at least one rectangular paddle connected to a handle at one end. The rectangular paddle is dimensioned to have a height appropriate for a type of player's instrument so that when the rectangular paddle when placed between the front teeth of the player, it holds the teeth apart a distance equal to the height of the paddle, that distance placing the player's mouth in a proper position for that instrument. The handle is preferably sized to fit through the opening in the mouthpiece of the player's instrument.

20 Claims, 3 Drawing Sheets

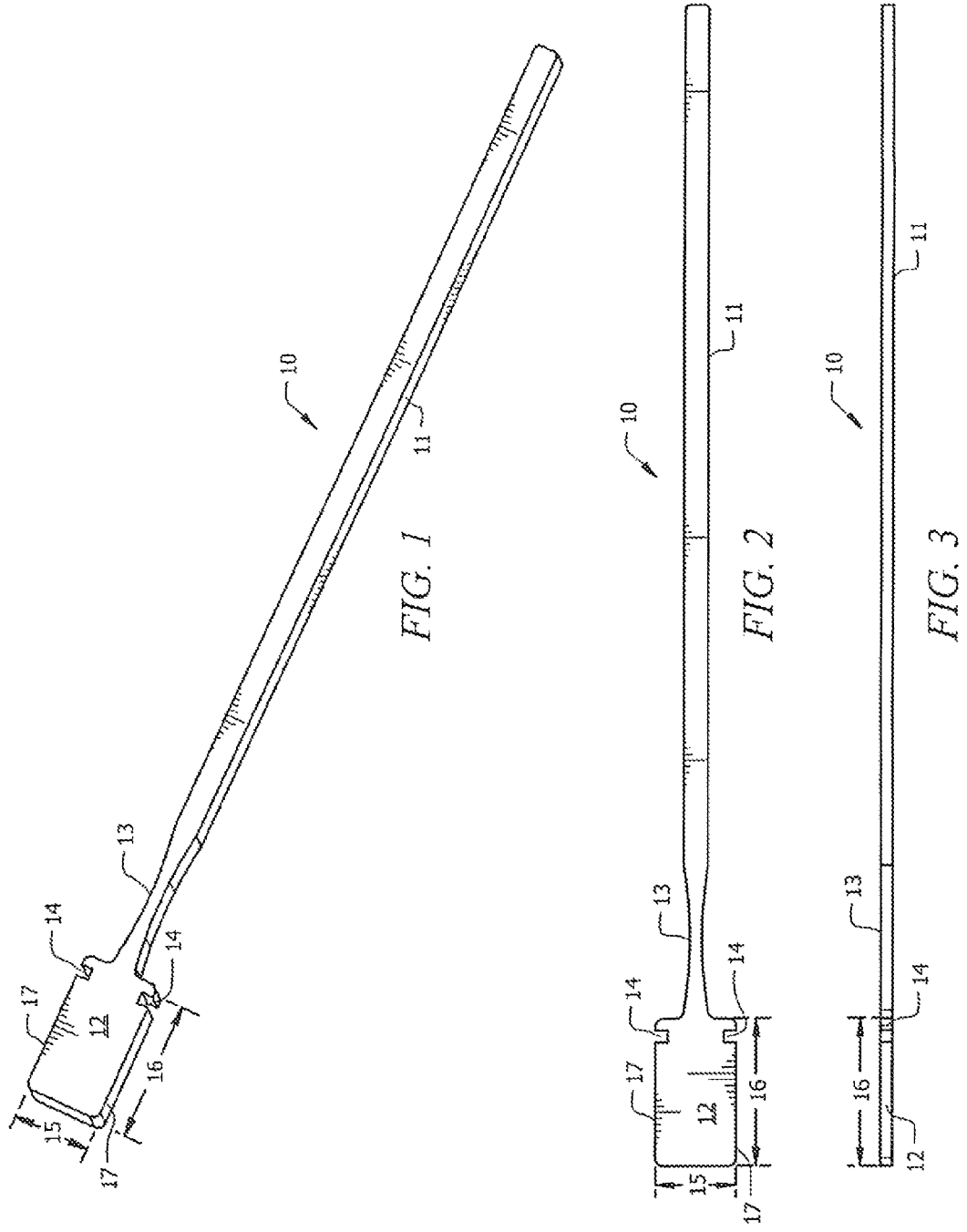

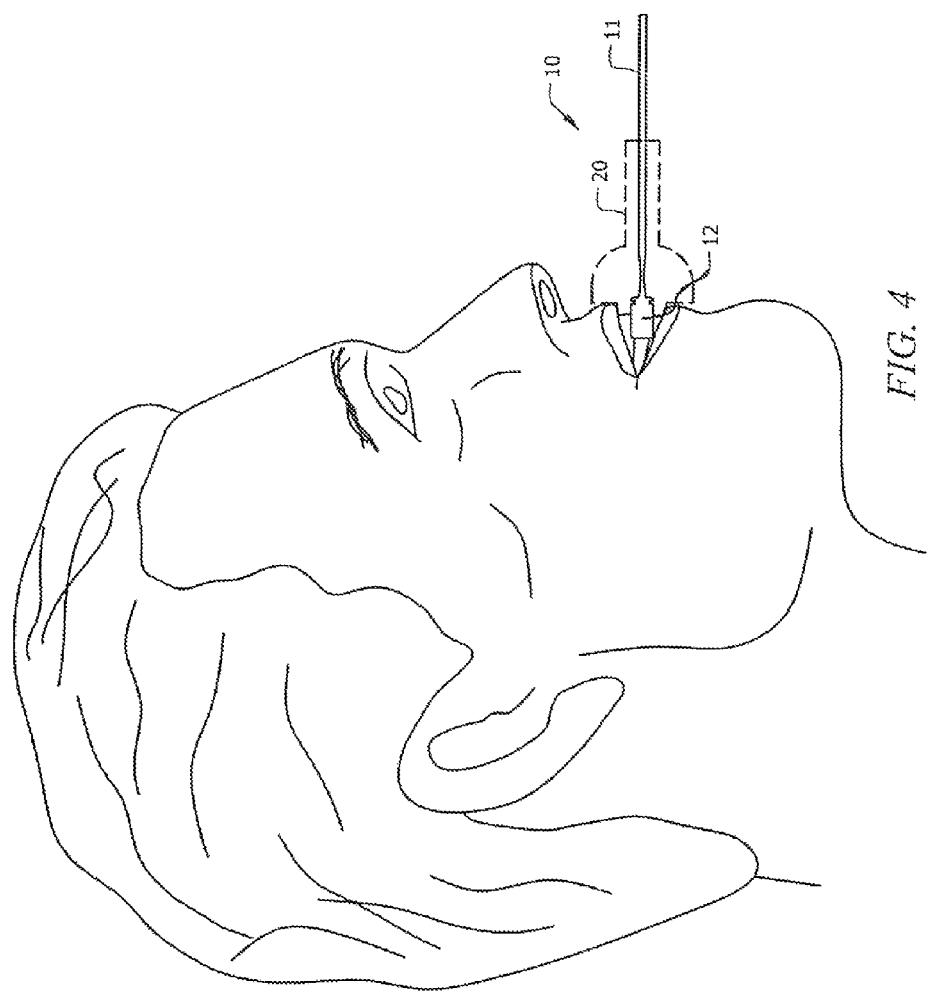

MUSICAL INSTRUMENT TRAINING AID

CROSS REFERENCE TO RELATED INFORMATION

This application claims the benefit of U.S. Provisional Patent Application Ser. No. 61/530,690, filed Sep. 2, 2011.

TECHNICAL FIELD

The present disclosure is directed to musical training aids, and more particularly to training aids that teach a brass player proper mouth, lip and jaw position.

BACKGROUND OF THE INVENTION

The embouchure is the use of facial muscles and the shaping of the lips to the mouthpiece of woodwind instruments or the mouthpiece of the brass instruments. The proper embouchure allows the instrumentalist to play the instrument at its full range with a full, clear tone and without strain or damage to one's muscles. While performing on a brass instrument, the sound is produced by the player buzzing his or her lips into a mouthpiece. Pitches are changed in part through altering the amount of muscular contraction in the lip formation. The performer's use of the air, tightening of cheek and jaw muscles, as well as tongue manipulation can affect bow the embouchure works.

For these reasons, mouth position in the mouthpiece is critical for players of brass instruments. Teaching the proper mouth and lip position on the mouthpiece, however, can be very difficult for students, particularly new students. Position of the jaw and tongue, in particular, can be very difficult to impart to the brass student. What is needed is a teaching aid that can help an instructor show a brass student proper mouth, lip and jaw position.

BRIEF SUMMARY OF THE INVENTION

In a preferred embodiment, a teaching aid for players of brass instruments is described that includes at least one rectangular paddle. The rectangular paddle dimensioned to have a height appropriate for a player's instrument such that the rectangular paddle when placed between the front teeth of the player holds the teeth apart a distance equal to the height of the paddle. A handle is connected to one end of the rectangular paddle, the handle sized to fit through the opening in a mouthpiece of the player's instrument.

In another preferred embodiment as method for teaching a player of brass instruments proper mouth position is described that includes placing a rectangular paddle of a teaching device, the teaching device having a handle connected to the rectangular paddle, between the front teeth of the player, the rectangular paddle dimensioned to have a height appropriate for the player's instrument, such that the rectangular paddle when placed between the front teeth of the player holds the teeth apart a distance equal to the height of the rectangular paddle. The method further includes holding the rectangular paddle by a handle attached to one end of the paddle while the student practices proper mouth position.

In yet another embodiment a method of forming a teaching aid for players of brass instruments is described that includes providing at least one rectangular paddle, the rectangular paddle dimensioned to have a height appropriate for a player's instrument, such that the rectangular paddle when placed between the front teeth of the player holds the teeth apart a distance equal to the height of the paddle, and providing a handle connected to one end of the rectangular paddle, the handle sized to fit through the opening in a mouthpiece of the player's instrument.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 1 is a perspective view of a preferred embodiment of a teaching device according to the concepts described herein;

FIG. 2 is a top view of the teaching device from FIG. 1;

FIG. 3 is a side view of the teaching device of FIG. 1;

FIG. 4 is a side view of the teaching device of FIG. 1 in use with a brass mouthpiece.

DETAILED DESCRIPTION OF THE INVENTION

Figure 5:
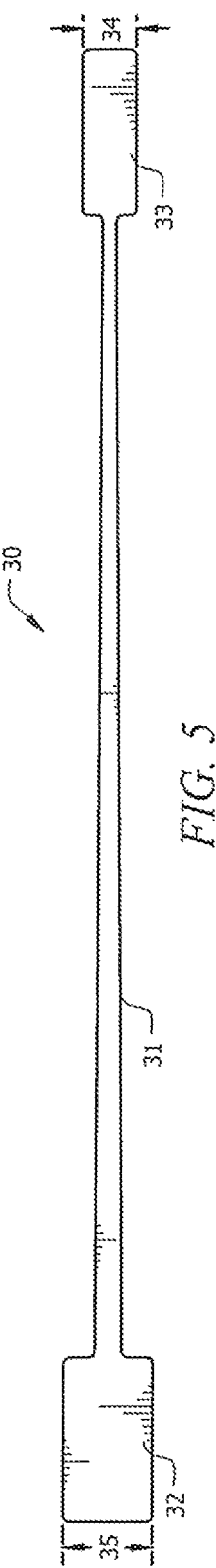
FIG. 5 is an alternate embodiment of a teaching device according to the concepts described herein having ends suitable for different types of mouthpieces.

The concepts described herein show a teaching device that is a tool designed to assist the beginning, intermediate, and advanced brass student in understanding the proper alignment and position of the tongue, teeth, and jaw in order to produce the fundamental characteristic sound of his/her instrument.

Referring now to FIGS. 1, 2 and 3, an embodiment of a teaching device 10 for brass players according to the concepts described herein is shown. The teaching device is formed of at least one rectangular element, or paddle 12, at the end of a handle 11 that is thin relative to the dimensions of paddle 12. A neck 13, which tapers along one or more sides of the handle can be included between the handle 11 and paddle 13, or the handle can mold directly into the paddle without changing dimensions. The indented portion of neck 13 provides for the contour of the lips when the teaching device 10 is used with a mouthpiece. While handle 11 has a rectangular cross section, any shape of handle may be used without departing from the scope of the present invention. The handle 11 is sized to fit comfortably through a mouthpiece opening and extend past the end of the mouthpiece a sufficient distance to allow it to be held comfortably.

Paddle 12 is roughly rectangular in shape and is of a height 15 and a length 16. The corners of paddle 12 may be tapered or rounded to remove any sharp edges or corners. In certain embodiments, notch 14 is formed in paddle 12 a small distance from where paddle 12 connects with handle 11. Notch 14 provides a tactile indication of when the paddle is inserted too deeply into the students mouth, as will be shown in more detail with reference to FIG. 4. Notch 14 is preferably part of the mold for forming teaching aid 10, but can also be formed after molding by removing the appropriate amount of material. Paddle 12 also preferably includes flat top and bottom edges 17, with the thickness of paddle 12 along those edges being sufficient to support the students teeth resting thereon.

In preferred embodiments, the paddle 12 for low brass instruments (trombones, tubas, etc.) has a height 15 of approximately three-eighths of an inch along the end that fits between the student's teeth, such that the upper and lower teeth are held three-eighths inch apart. For high brass instruments (trumpets, french horns, etc.) the paddle has a preferred height of approximately one-quarter of an inch. Variations can be made to the actual dimensions without departing from the scope of the invention, and additional embodiments more precisely configured for each type of instrument would also be well within the scope of the concepts described herein. The length 16 of the paddle 12, while not as important as the height dimension, is preferably three-quarters of an inch, but can be of any appropriate length such that it can fit in the student's mouth while fitting within the mouthpiece and not interfering with the student's tongue position.

The device can be made of any suitable material, but in preferred embodiments is made of a food grade hard plastic.

Referring now to FIG. 4, the teaching device 10 of FIG. 1 is shown positioned in a preferred position in a student's mouth with the handle 11 extending, through the tube of the mouthpiece 20. As can be seen, the paddle 12 of teaching device 10 is placed between the upper and lower front teeth resting in the crevice between those teeth, protruding slightly into the student's mouth, forcing him/her to create an opening of adequate space between the teeth for the projected flow of air needed to produce a sound on a brass instrument. At the same time, the paddle 12 of teaching device 10 forces the student's tongue down to the bottom of his/her mouth and therefore opening the throat.

The teaching device will also allow the student to demonstrate the proper embouchure for his/her instrument. With the teaching device in place, and by firming up the corners of the mouth holding the teaching device straight out with only the embouchure, the student will be able to immediately feel the proper placement of tongue, jaw, teeth, and embouchure needed to produce the desired sound. The student should be able to "buzz" with the teaching device in place. The teaching device can used alone or can be placed inside the mouthpiece as shown in FIG. 4, protruding into the student's mouth, allowing the student to hold the opposite end of the teaching device in place and produce a "buzz" through the mouthpiece.

Referring now to FIG. 5, in other preferred embodiments, a teaching device 30 can have a paddle 32 and 33 can be placed at either end of the handle 31, the two opposing paddles are sized to teach proper mouth position for different brass instruments, i.e. a smaller paddle 33 with a height 34 optimized for high brass instruments with smaller mouthpieces and a larger paddle 32 with height 35 optimized for low brass instruments (trombone, tuba, etc.) with larger mouthpieces. In the embodiment with a paddle at each end of the handle, it may sometimes be necessary, such as in the case of some high brass instruments with small mouthpieces, to break the teaching device in half so that the thin handle can be inserted through the mouthpiece, allowing the paddle end to protrude into the student's mouth.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A teaching aid for players of brass instruments comprising:
   at least one rectangular paddle, the rectangular paddle dimensioned to have a height appropriate for a player's instrument, such that the rectangular paddle when placed between the front teeth of the player holds the teeth apart a distance equal to the height of the paddle; and
   a handle connected to one end of the rectangular paddle, the handle sized to fit through the opening in a mouthpiece of the player's instrument.

2. The teaching aid of claim 1 wherein the player's instrument is a high brass instrument and the height of the paddle is approximately one-quarter of an inch.

3. The teaching aid of claim 1 wherein the player's instrument is a low brass instrument and the height of the paddle is approximately three-eighths of an inch.

4. The teaching aid of claim 1 further comprising a notch on a top and bottom edge of the rectangular paddle proximate to the end of the rectangular paddle connected to the handle.

5. The teaching aid of claim 1 further comprising a neck between the handle and rectangular paddle.

6. The teaching aid of claim 1 further comprising a second paddle dimensioned with a height different than the rectangular paddle, wherein the second paddle is attached to the opposite end of the handle.

7. A method for teaching a player of brass instruments proper mouth position comprising:
   placing a rectangular paddle of a teaching device, the teaching device having a handle connected to the rectangular paddle, between the front teeth of the player, the rectangular paddle dimensioned to have a height appropriate for the player's instrument, such that the rectangular paddle when placed between the front teeth of the player holds the teeth apart a distance equal to the height of the rectangular paddle; and
   holding the rectangular paddle by a handle attached to one end of the paddle while the student practices proper mouth position.

8. The method of claim 7 further comprising inserting the handle of the teaching device through an opening in a mouthpiece of the player's instrument such that the player may use the teaching device while blowing through the mouthpiece.

9. The method of claim 7 wherein the player's instrument is a high brass instrument and the height of the paddle is approximately one-quarter of an inch.

10. The method of claim 7 wherein the player's instrument is a low brass instrument and the height of the paddle is approximately three-eighths of an inch.

11. The method of claim 7 further comprising a notch on as top and bottom edge of the rectangular paddle proximate to the end of the rectangular paddle connected to the handle.

12. The method of claim 7 further comprising a neck between the handle and rectangular paddle.

13. The method of claim 7 further comprising a second paddle dimensioned with a height different than the rectangular paddle, wherein the second paddle is attached to the opposite end of the handle.

14. A method of forming a teaching aid for players of brass instruments comprising:
   providing at least one rectangular paddle, the rectangular paddle dimensioned to have a height appropriate for a player's instrument, such that the rectangular paddle when placed between the front teeth of the player holds the teeth apart a distance equal to the height of the paddle; and
   providing a handle connected to one end of the rectangular paddle, the handle sized to fit through the opening in a mouthpiece of the player's instrument.

15. The method of claim 14 wherein the player's instrument is a high brass instrument and the height of the paddle is approximately one-quarter of an inch.

16. The method of claim 14 wherein the players instrument is a low brass instrument and the height of the paddle is approximately three-eighths of an inch.

17. The method of claim 14 further comprising providing a notch on a top and bottom edge of the rectangular paddle proximate to the end of the rectangular paddle connected to the handle.

18. The method of claim 14 further comprising providing a neck between the handle and rectangular paddle.

19. The method of claim 14 further comprising providing a second paddle dimensioned with a height different than the rectangular paddle, wherein the second paddle is attached to the opposite end of the handle.

20. The method of claim 19 wherein the paddle is dimensioned for a high brass instrument and the height of the paddle is approximately one-quarter of an inch and wherein the second paddle is dimensioned for a low brass instrument and the height of the paddle is approximately three-eighths of an inch.

* * * * *